United States Patent
Hernandez

Patent Number: 5,712,021
Date of Patent: Jan. 27, 1998

[54] DECALS FOR ALL OCCASIONS

[76] Inventor: Yadira L. Hernandez, 910 Robert E. Lee Blvd., New Orleans, La. 70124

[21] Appl. No.: 753,488

[22] Filed: Nov. 26, 1996

[51] Int. Cl.$^6$ ............................................. B32B 9/00
[52] U.S. Cl. ......................... 428/192; 428/43; 428/79; 428/101; 428/137; 428/138; 428/195; 428/196; 428/286; 428/914; 156/152; 156/230; 156/237
[58] Field of Search .......................... 428/196, 204, 428/207, 252, 284, 286, 914, 43, 79, 137, 138, 195, 101, 136, 192; 156/155, 237, 542, 230, 277, 152, 358

[56] References Cited

U.S. PATENT DOCUMENTS

| | | | |
|---|---|---|---|
| D. 267,619 | 1/1983 | Rubin | D7/39 |
| 4,026,755 | 5/1977 | Gossie | 156/538 |
| 5,133,819 | 7/1992 | Croner | 156/230 |
| 5,229,201 | 7/1993 | Blanco | 428/284 |
| 5,263,529 | 11/1993 | Landis | 160/236 |
| 5,328,535 | 7/1994 | Blanco | 156/155 |
| 5,443,869 | 8/1995 | Harris | 428/13 |
| 5,494,726 | 2/1996 | Inomata | 428/131 |
| 5,563,205 | 10/1996 | Mayer et al. | 524/556 |

*Primary Examiner*—Patrick Ryan
*Assistant Examiner*—Abraham Bahta
*Attorney, Agent, or Firm*—Patent & Trademark Services; Joseph H. McGlynn

[57] ABSTRACT

A decal affixed to a plastic sleeve, which is shaped into a cylindrical orientation in a permanent or semi-permanent fashion. The plastic sleeve and decal assembly can be placed over any type of drinking glass, thereby forming a decorative covering for the glass. An adhesive on the back of the plastic affixes the plastic to the glass in a semi-permanent state.

12 Claims, 1 Drawing Sheet

DECALS FOR ALL OCCASIONS

BACKGROUND OF THE INVENTION

This invention relates generally to decals and, more particularly, to decals which may be placed temporarily on objects.

DESCRIPTION OF THE PRIOR ART

Numerous inventions relating to decals have been proposed in the prior art. Often, they seek to allow the transfer of a design or decoration onto a surface which is not easily decorated. U.S. Pat. No. Des. 267,619 discloses an ornamental design for a decal or transfer surface or the like for culinary ware. The decal or transfer surface is of no substantial thickness.

U.S. Pat. No. 5,133,819 discloses a process for reproducing a source image on a fabric. The process provides a source image from a heat fused toner, and a fabric having a heat activated adhesive coating on one side thereof. The fabric and coating are heated so as to activate the adhesive so that the image from the source is adhered to the adhesive. A transfer fabric receives the image, and then transfers it to the receiving fabric as it is heated.

U.S. Pat. No. 5,229,201 discloses methods for applying decals to various porous surfaces, including textile surfaces, such as canvases. A bonding agent is applied to the porous surface, providing a water slide-off decal. A design layer is placed in between coating layers and is thus attached to the porous surface.

U.S. Pat. No. 5,443,869 discloses a composite laminated film-to-glass panel for the display by back lighting of graphics and/or advertising and instructional alpha-numerical information relating to game machines, product dispensing apparatus, and wall displays and a method of producing such panel. The film-to-glass panel of the invention is comprised of a primary front sheet of glass and a secondary composite laminated layer.

U.S. Pat. No. 5,494,726 discloses a decal assembly for applying a decal onto a surface. The assembly includes a decal having an adhesive layer on a back side thereof and an opaque application tape layer positioned on a front side of the decal, opposite the back side, wherein the opaque application later includes aligning elements for properly aligning the decal on the surface.

Most of the prior art decal application methods and assemblies have been aimed only at allowing the permanent application of a decal to a fabric material or other planar region. There remains a need for a device which facilitates the application of a decal onto a cylindrical region in a semi-permanent fashion.

SUMMARY OF THE INVENTION

The present invention comprises a decal affixed to a plastic sleeve, which is shaped into a cylindrical orientation in a permanent or semi-permanent fashion. The plastic sleeve and decal assembly can be placed over any type of drinking glass, thereby forming a decorative covering for the glass. An adhesive on the back of the plastic affixes the plastic to the glass in a semi-permanent state.

Accordingly, it is an object of this invention to provide a means for applying decals to a cylindrical region.

It is a further object of this invention that the decal be affixed in a semi-permanent manner.

Finally, it is an object of this invention that the process of decal application be sufficiently simple that it may done by any person.

DESCRIPTION OF THE PREFERRED EMBODIMENT

Figure 1:
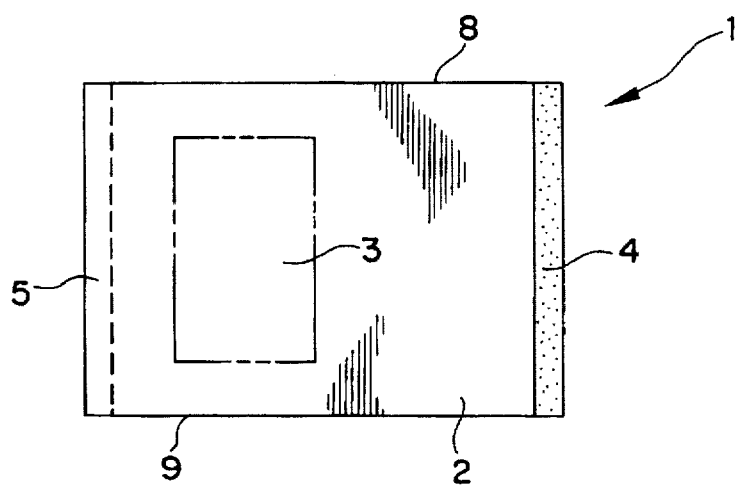
FIG. 1 shows a planar view of the invention.

Referring now to the drawings, there is shown in FIG. 1 the present invention 1 comprising a rectangular piece 2 with a decorative pattern, design, or insignia 3 on a portion of the rectangular piece 2. Along one end of the rectangular piece 2 is a smaller rectangular region 4 with an adhesive material on the same side of the large rectangular piece 2 as the design 3, which is the side to be designated as the front of the invention 1. At the end directly opposite of the adhesive-coated region 4 is a rectangular region 5 of the same size and orientation as the adhesive-coated region 4. The region 5 opposite the adhesive-coated region 4 may or may not have a similar adhesive material on the side of the large rectangular piece 2 which is opposite the front, that is, the back side of the large rectangular piece 2.

Figure 2:
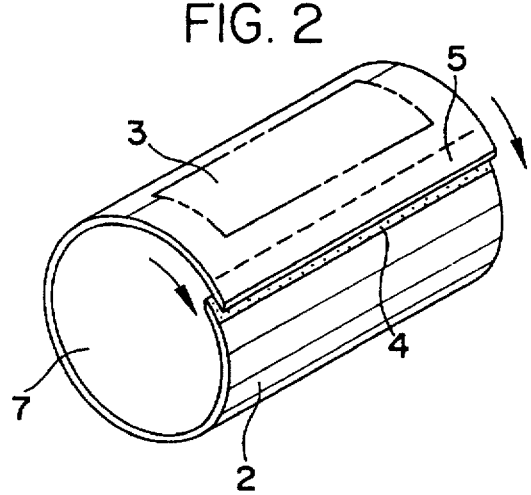
FIG. 2 shows a perspective view of the invention as it is secured into a cylindrical sleeve.

FIG. 2 shows the invention as it shaped for use, that is, as it is transformed from a planar object into a cylindrical form. The cylindrical form is accomplished by rolling the edges which are not related to the coating of adhesives, that is, the edges 8/9 on the top and bottom of the large rectangular piece 2. The edges 8/9 are rolled into a circular form, as indicated by the arrows in FIG. 2, thus giving the invention a cylindrical form. The smaller regions 4/5 with adhesive coatings are positioned over one another so that they come in contact, thus activating the adhesives and thereby securing the invention in the cylindrical shape and forming a decorative sleeve. The inner side of the cylindrical region 7 has an adhesive substance on its face.

Figure 3:
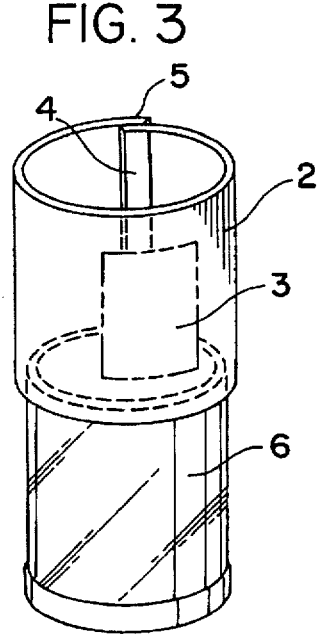
FIG. 3 shows a perspective view of the sleeve as it is used.

In use, the invention is placed over any suitably sized cylindrical object, such as a normal drinking glass 6, which the user desires to decorate with the design 3, as shown in FIG. 3. The user slips the invention over the cylindrical object 6, so that the design 3 is seen and orientated to the user's satisfaction. An adhesive on the inner face 7 of the invention is then activated, thus securing the invention to the object 6. To remove the invention, the bond of either the adhesive on the inner face of the invention 7, or the adhesive securing the cylindrical shape is broken, thus allowing the removal of the invention from the object 6. The invention I is manufactured in the planar orientation described herein, consisting of substantially rectangular regions. The large rectangular piece 2 is made of any conventional plastic material which is durable and can withstand the forces associated with the described action of adhering and removing the invention from cylindrical shapes. The plastic must also be thin enough so that it may be rolled and secured into the cylindrical orientation.

The adhesive securing the large plastic piece 2 into a cylindrical form may be any non-water soluble adhesive which is strong enough for the use. The adhesive on the inner face 7 of the invention may be any normal adhesive which is strong enough to secure the invention to the object 6, but not so strong that the bond is permanent. The decorative design 3 may attached to the plastic piece 2 in virtually any permanent fashion, such as by permanent imprinting or drawing onto the plastic, or by a decal with a strong adhesive backing.

In an alternate embodiment, the invention may not have the adhesive on the inner face 7 of the sleeve. Instead, the sleeve is made from heat shrink plastic and is secured to the object 6 by heating the sleeve so that the plastic shrinks to the size of the object 6. In all other respects, this embodiment is identical to the first embodiment.

Although the decal sleeve and the means of using the same according the present invention have been described in the foregoing specification with considerable detail, it is to be understood that modifications may be made to the invention which do not exceed the scope of the appended claims, and modified forms of the present invention done by others skilled in the art to which the invention pertains will be considered infringements of the invention when those modified forms fall within the claimed scope of this invention.

What I claim as my invention is:

1. A decal adapted to be attached to a drinking vessel, comprising:

means for placing a design on the exterior of a material, said material having inner and outer surfaces and longitudinal parallel edges, means on said edges for securing said edges together, and means on said inner surface for affixing said decal to said drinking vessel.

2. The decal as claimed in claim 1, wherein said design is imprinted on said material.

3. The decal as claimed in claim 1, wherein said material is constructed of a plastic material so as to be substantially waterproof while said decal is in use.

4. The decal as claimed in claim 1, wherein said decal is constructed of a shrink-wrap material which is substantially waterproof while said decal is in use.

5. The decal as claimed in claim 1, wherein said material is affixed to said drinking vessel by means of a semi-permanent water-based adhesive applied to an interior surface, said adhesive being used to temporarily adhere said material to said drinking vessel yet allow for easy removal of said material from said drinking vessel.

6. The decal as claimed in claim 1 wherein said means on said edges for securing said edges together is semi-permanent water-based adhesive.

7. The decal as claimed in claim 6, wherein said means on said edges for securing said edges together is semi-permanent water-based adhesive.

8. A method for using the decal as claimed in claim 7, wherein said method comprises:

immersing said material in liquid to activate said adhesive, rolling said material into a cylindrical shape, engaging said edges together, sliding said material onto an exterior surface of said drinking vessel.

9. A method for using the decal as claimed in claim 7, wherein said material is immersed in a liquid to deactivate said adhesive for removal from said exterior of said drinking vessel.

10. A method for using the decal as claimed in claim 4, wherein said method comprises:

rolling said material into a cylindrical shape, engaging said edges together, sliding said material onto an exterior surface of said drinking vessel, immersing said drinking vessel in liquid, whereby said material will shrink onto said drinking vessel for a snug fit around said exterior of said drinking vessel.

11. A method for using the decal as claimed in claim 4, wherein said material is removable by means of cutting said material away from said drinking vessel.

12. A method for using the decal as claimed in claim 4, wherein said material is removable by means of re-immersing said drinking vessel in said liquid, allowing said material to expand, and sliding said material from said drinking vessel.

* * * * *